United States Patent
Lee et al.

(10) Patent No.: US 9,730,000 B2
(45) Date of Patent: Aug. 8, 2017

(54) APPARATUS FOR CONSTRUCTING UTILIZATION INFORMATION OF SENSOR AND METHOD THEREOF

(71) Applicant: Hyundai Motor Company, Seoul (KR)

(72) Inventors: Dong Youl Lee, Seoul (KR); Young Su Kim, Yongin-si (KR); Chul Min Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/158,707

(22) Filed: May 19, 2016

(65) Prior Publication Data
US 2017/0099563 A1    Apr. 6, 2017

(30) Foreign Application Priority Data
Oct. 1, 2015    (KR) .................... 10-2015-0138802

(51) Int. Cl.
*H04W 4/00* (2009.01)
*H04W 60/00* (2009.01)

(52) U.S. Cl.
CPC .......... *H04W 4/006* (2013.01); *H04W 4/008* (2013.01); *H04W 60/00* (2013.01); *B60W 2710/30* (2013.01); *H04M 2250/12* (2013.01)

(58) Field of Classification Search
None
See application file for complete search history.

(56) References Cited

U.S. PATENT DOCUMENTS

| 8,907,771 B2 | 12/2014 | Vasquez et al. |
| 2010/0316255 A1 | 12/2010 | Mathony et al. |
| 2011/0012720 A1* | 1/2011 | Hirschfeld ........... G07C 5/0808 340/439 |
| 2015/0046197 A1 | 2/2015 | Peng et al. |
| 2016/0044364 A1* | 2/2016 | Bai .................. H04N 21/41422 725/75 |
| 2016/0050114 A1* | 2/2016 | John Archibald .... G06F 1/3206 370/254 |
| 2016/0090055 A1* | 3/2016 | Breed .................. B60R 16/037 701/2 |

FOREIGN PATENT DOCUMENTS

| JP | 2012-136210 A | 7/2012 |
| JP | 2015-089808 A | 5/2015 |
| KR | 10-2005-0079260 A | 8/2005 |
| KR | 10-1103231 B1 | 1/2012 |
| KR | 10-1339454 B1 | 12/2013 |

\* cited by examiner

*Primary Examiner* — Daniel Lai
(74) *Attorney, Agent, or Firm* — Brinks Gilson & Lione (57) ABSTRACT

Provided are an apparatus for constructing utilization information of a sensor, capable of collecting information regarding various sensors installed in a mobile device of an occupant positioned within a vehicle from the mobile device, comparing the information regarding the sensors with characteristics of various sensors installed in the vehicle and performing analysis to generate utilization information so that the various sensors installed in the mobile device may be utilized in the vehicle, and a method thereof. The apparatus for constructing utilization information of a sensor constructs utilization information between various sensors provided in the mobile device and various sensors provided in the vehicle by matching the corresponding sensors of the mobile device in consideration of types, functions, and positions of the sensors of the vehicle.

14 Claims, 6 Drawing Sheets

APPARATUS FOR CONSTRUCTING UTILIZATION INFORMATION OF SENSOR AND METHOD THEREOF

CROSS-REFERENCE TO RELATED APPLICATION

This application is based on and claims the benefit of priority to Korean Patent Application No. 10-2015-0138802, filed on Oct. 1, 2015, in the Korean Intellectual Property Office, the disclosure of which is incorporated herein in its entirety by reference.

TECHNICAL FIELD

The present disclosure relates to an apparatus for constructing utilization information of a sensor and a method thereof, and more particularly to a technique of constructing utilization information of various sensors provided in a mobile device and various sensors provided in a vehicle and utilizing mutual sensors as necessary.

In the present disclosure, a mobile device, such as a device including at least one of an accelerometer, a gyro sensor, an image sensor, an infrared sensor, a temperature sensor, a pressure sensor, a gravity sensor, a geomagnetic sensor, and a GPS receiver, includes a portable online game machine, a smartphone, a smart glass, smart shoes, a smart watch, a smart band, and a smart camera.

A difference between a position of a sensor of a mobile device within a vehicle and a position of the mobile device within the vehicle is included within an error range, and thus, the position of the sensor of the mobile device and the position of the mobile device are used as having the same concept.

BACKGROUND

Recently released vehicles include a smart cruise control (SCC) system, a smart parking assist system (SPAS), a lane keeping assist system (LKAS), a blind spot detection (BSD) system, a lane departure warning system (LDWS), and a side obstacle warning system (SOWS) to assist in driving of a driver. The number of installed systems varies depending on vehicle types and classes. That is, all of the systems may be installed in a vehicle having high specifications, while only some of the systems may be installed in a vehicle having low specifications.

These systems are operated on the basis of various sensors. Thus, when a specific system is installed in a vehicle, sensors required for the specific system should be provided.

When an exchange period of a vehicle is generally considered to be 5 to 10 years, a sensor provided in a vehicle at the time of purchasing the vehicle may be the latest sensor, but since highly efficient sensors are developed over time, performance of the system is degraded over time. That is, systems installed in a vehicle are degraded to systems of low specifications and low performance with the passage of time.

Highly efficient mobile devices are released day by day. Such mobile devices are equipped with various functions and various latest sensors to perform specific functions.

SUMMARY

The present disclosure proposes a scheme of utilizing a highly efficient sensor of a mobile device in a vehicle.

In a related art, a technique of enabling a smartphone and a vehicle terminal to interwork with each other is merely to the point that the vehicle terminal reads and plays various multimedia data (music, movie, etc.) stored in the smartphone or performs handsfree function through Bluetooth communication.

That is, the related art cannot provide a scheme in which various driving assist systems installed in a vehicle utilize various sensors provided in a mobile device of an occupant of a vehicle.

The present disclosure has been made to address the above-mentioned problems occurring in the prior art while advantages achieved by the prior art are maintained intact.

An aspect of the present disclosure provides an apparatus for constructing utilization information of a sensor, capable of collecting information regarding various sensors installed in a mobile device of an occupant positioned within a vehicle from the mobile device, comparing the information regarding the sensors with characteristics of various sensors installed in the vehicle and performing analysis to generate utilization information so that the various sensors installed in the mobile device may be utilized in the vehicle, and a method thereof.

Technical subjects of the present disclosure are not limited to the foregoing technical subjects and any other technical subjects not mentioned will be understood from the following descriptions and become apparent by exemplary embodiments of the present disclosure. Also, it may be easily understood that the advantages, features and aspects of the present disclosure may be realized by means and combinations demonstrated in claims.

In an exemplary form of the present disclosure, an apparatus for constructing utilization information of a sensor includes: a sensor information collector configured to collect sensor information from a mobile device; a sensor searcher configured to search for a sensor of a vehicle; a sensor matcher configured to match a corresponding sensor of the mobile device to the sensor of the vehicle searched by the sensor searcher in consideration of a type, function, and position of the sensor of the vehicle; a utilization information generator configured to compare a type, function, and position of the sensor of the mobile device and the type, function, and position of the sensor of the vehicle which are matched to each other by the sensor matcher to generate utilization information; and a controller configured to control the sensor information collector to collect sensor information from the mobile device within the vehicle when the vehicle is started.

In another exemplary form of the present disclosure, a method of constructing utilization information of a sensor includes: activating, by a controller, a sensor information collector when a vehicle is started; collecting, by the sensor information collector, sensor information from a mobile device; searching, by a sensor searcher, for a sensor of the vehicle; matching, by a sensor matcher, a corresponding sensor of the mobile device to the searched sensor of the vehicle in consideration of a type, function, and position of the searched sensor of the vehicle; and comparing, by a utilization information generator, a type, function, and position of the sensor of the mobile device and the type, function, and position of the sensor of the vehicle matched to each other to generate utilization information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The aforementioned objects, features and advantages of the present disclosure will become more apparent through the following detailed description with respect to the accompanying drawings, and accordingly, a technical concept of the present disclosure may be easily practiced by those skilled in the art to which the present invention pertains. In describing the exemplary forms of the present disclosure, when it is determined that a detailed description of known components or functions associated with the present disclosure unnecessarily obscures the gist of the present disclosure, the detailed description thereof will be omitted. Hereinafter, the exemplary forms of the present disclosure will be described in detail with reference to the accompanying drawings.

Figure 1:
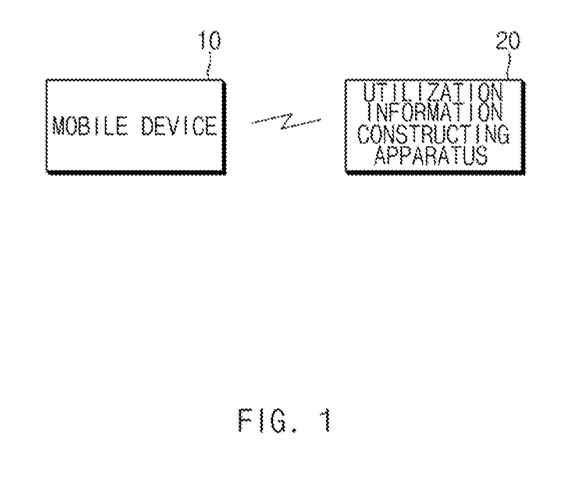
FIG. 1 is a block diagram illustrating a system for constructing utilization information of a sensor.

FIG. 1 is a block diagram illustrating a system for constructing utilization information of a sensor.

As illustrated in FIG. 1, the system for constructing utilization information of a sensor may include a mobile device 10 and an apparatus 20 for constructing utilization information of a sensor (hereinafter, referred to simply as a "utilization information constructing apparatus 20"), and for communication between the mobile device 10 and the utilization information constructing apparatus 20, near field communication (NFC) technology such as Wi-Fi or Bluetooth may be applied. Here, the utilization information constructing apparatus 20 may be implemented as a separate independent apparatus, or a controller of the mobile device 10 may be implemented to perform a function of the utilization information constructing apparatus 20 or a controller of a vehicle terminal may be implemented to perform a function of the utilization information constructing apparatus 20. Here, the vehicle terminal, as a terminal installed in a vehicle, includes a telematics unit, an audio, video, and a navigation (AVN) system.

For example, in a case in which a function of the utilization information constructing apparatus 20 is implemented by software in the mobile device 10, hardware (memory, communication module, etc.) of the mobile device 10 may be used, and thus, an additional component is not necessary, compared with a case in which the function of the utilization information constructing apparatus 20 is implemented as an independent apparatus. This is the same in a case in which a function of the utilization information constructing apparatus 20 is implemented in the vehicle terminal.

First, the mobile device 10, as a device including at least one of an accelerometer, a gyro sensor, an image sensor, an infrared sensor, a temperature sensor, a pressure sensor, a gravity sensor, a geomagnetic sensor, and a GPS receiver, includes a portable online game machine, a smartphone, a smart glass, smart shoes, a smart watch, a smart band, and a smart camera.

The aforementioned mobile device 10 has an application for transmitting and receiving sensor information required for constructing utilization information of a sensor, and thus, the mobile device 10 may perform the following process.

As the mobile device 10 receives a device searching message from the utilization information constructing apparatus 20, the mobile device 10 transmits information regarding a sensor thereof (hereinafter, referred to as sensor information of the mobile device) to the utilization information constructing apparatus 20. Here, the mobile device 10 may be set to transmit sensor information thereof to the utilization information constructing apparatus 20 without performing a separate confirmation process or upon receiving user confirmation in a case in which the device searching message is received during a process of installing an application.

When transmitting the sensor information, the mobile device 10 may also transmit identification information (a unique number, a medium access control (MAC) address, an ID, etc.) together so as to be used for the utilization information constructing apparatus 20 to identify a source of the sensor.

In an exemplary form of the present disclosure, a single mobile device is described as an example to help understanding of the present disclosure, but a plurality of mobile devices may also be provided or the mobile device 10 may be a representative mobile device as described in another exemplary embodiment hereinafter.

The utilization information constructing apparatus 20 is activated by interworking with the vehicle. That is, when the vehicle is started or when an ignition key is turned on, the utilization information constructing apparatus 20 is activated to transmit the device searching message to the mobile device 10 within the vehicle. Here, the utilization information constructing apparatus 20 may adjust transmission strength of the device searching message such that only the mobile device 10 held by the driver or the occupant receives the device searching message.

Also, the utilization information constructing apparatus 20 collects information regarding various sensors (hereinafter, referred to as "sensor information of the vehicle") provided in the vehicle from a vehicle network or electronic control units (ECUs) of various driving assist systems.

Also, the utilization information constructing apparatus 20 classifies the collected sensor information of the vehicle according to purpose and function. This is a preprocessing process required for constructing utilization information.

Also, on the basis of the sensor information received from the mobile device 10 and the sensor information collected from the vehicle, the utilization information constructing apparatus 20 performs an operation of matching sensors of the mobile device 10 and sensors of the vehicle. Here, the utilization information constructing apparatus 20 performs the matching operation in consideration of types of the sensors, functions of the sensors, and positions of the sensors.

Also, the utilization information constructing apparatus 20 determines utilization of various sensors of the mobile device 10 on the basis of the matching result. That is, the utilization information constructing apparatus 20 determines utilization of the sensors by comparing the types, functions, and positions of the sensors of the mobile device 10 and the types, functions, and positions of the sensors of the vehicle matched to each other.

For example, in a case in which a sensor 1 of the vehicle and a sensor 1 of the mobile device 10 are matched, first, a position of the sensor 1 of the mobile device 10 (that is, a position of the mobile device 10 with respect to the utilization information constructing apparatus 20) and a position of the sensor 1 of the vehicle are compared and the sensor 1 of the mobile device 10 is scored. Here, as the sensor 1 of the mobile device is placed in a position in which a value closer to a value sensed by the sensor 1 of the vehicle is sensed, a higher score is given. That is, in a case in which a value sensed by the sensor 1 of the vehicle is 5, when a value sensed by the sensor 1 of the mobile device 10 in a first position is 4 and a value sensed by the sensor 1 of the mobile device 10 in a second position is 3, the sensor 1 of the mobile device 10 placed in the first position is given a higher score than that given when the mobile device 10 is placed in the second position.

Also, a higher score is given as performance of a sensor is higher.

Also, in consideration of types of sensors, a higher score is given as compatibility of a sensor is higher.

Thereafter, the utilization information constructing apparatus 20 determines utilization on the basis of scores given to the respective sensors of the mobile device 10.

For example, scores given to the respective sensors of the mobile device 10 are classified into "high", "medium", and "low", and when a sensor of the mobile device 10 has the "high" value, it is determined that the sensor of the mobile device 10 may be used in place of a sensor of the vehicle. Also, when a sensor of the mobile device 10 has the "medium" value, it is determined that the sensor of the mobile device 10 and a sensor of the vehicle may be mixedly used together, and when a sensor of the mobile device 10 has the "low" value, it is determined that the sensor of the mobile device 10 may be used in place of a sensor of the vehicle when the sensor of the vehicle has an error.

That is, as for utilization of the sensor of the vehicle and the sensor of the mobile device 10 matched to each other, if the use of the sensor of the mobile device 10 has a result better than that when the sensor of the vehicle is used in terms of performance of the system, the sensor of the mobile device is used in place of the sensor of the vehicle, and when the use of the sensor of the mobile device 10 and the use of the sensor of the vehicle bring about similar results, the sensor of the vehicle and the sensor of the mobile device 10 are mixedly used together. Meanwhile, if the use of the sensor of the mobile device brings about a result worse than that when the sensor of the vehicle is used, the sensor of the mobile device is not used, except under special circumstances. Here, the special circumstances include a case in which the sensor of the vehicle has an error or a case in which the sensor of the vehicle malfunctions temporarily due to a surrounding environment.

Also, the utilization information constructing apparatus 20 constructs utilization information between the sensor of the mobile device 10 and the sensor of the vehicle on the basis of the utilization.

The constructed utilization information may be utilized by every system installed in the vehicle.

Hereinafter, a specific configuration of the utilization information constructing apparatus 20 will be described with reference to FIG. 2.

Figure 2:
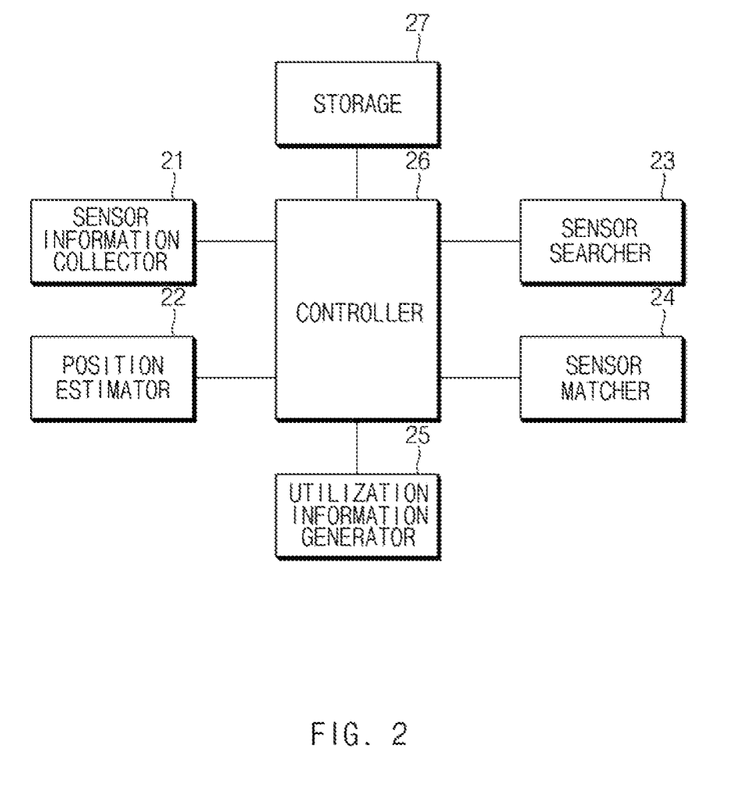
FIG. 2 is a block diagram illustrating an apparatus for constructing utilization information of a sensor.

FIG. 2 is a block diagram illustrating the apparatus 20 for constructing utilization information of a sensor, in which block components based on functions are illustrated, but a controller 26 may be implemented to perform all the functions.

As illustrated in FIG. 2, the apparatus 20 for constructing utilization information of a sensor includes a sensor information collector 21, a position estimator 22, a sensor searcher 23, a sensor matcher 24, a utilization information generator 25, the controller 26, and a storage 27.

The components will be described. First, when the vehicle is started or when an ignition key is turned on, the sensor information collector 21 transmits a device searching message (sensor information request message) to the mobile device 10 within the vehicle and obtains sensor information in response thereto. Here, the sensor information collector 21 may receive pieces of sensor information (a type of a sensor, a function of a sensor, and the like) from each of a plurality of mobile devices, and each of the pieces of sensor information is received together with identification information (a unique number, a MAC address, an ID, etc.) such that a source thereof may be known. Also, the mobile device 10 may be a representative mobile device described in another exemplary form hereinafter.

Also, the sensor information collector 21 communicates with the mobile devices using NFC such as Bluetooth or Wi-Fi. Here, in a case in which the sensor information collector 21 transmits the sensor information request message to the plurality of mobile devices, the sensor information collector 21 transmits the sensor information request message in a broadcasting manner.

Next, the position estimator 22 estimates a position of the mobile device 10 within the vehicle. The process of estimating a position of the mobile device 10 within the vehicle may be performed by each of the mobile devices 10. In this case, the pieces of sensor information include types, functions, and positions of sensors.

The position estimator 22 has two ultrasonic sensors for measuring a distance to the mobile device 10. Here, the ultrasonic sensor may be replaced with an infrared sensor.

Hereinafter, a process of estimating positions of a plurality of mobile devices within a vehicle will be described in detail with reference to FIG. 3.

Figure 3:
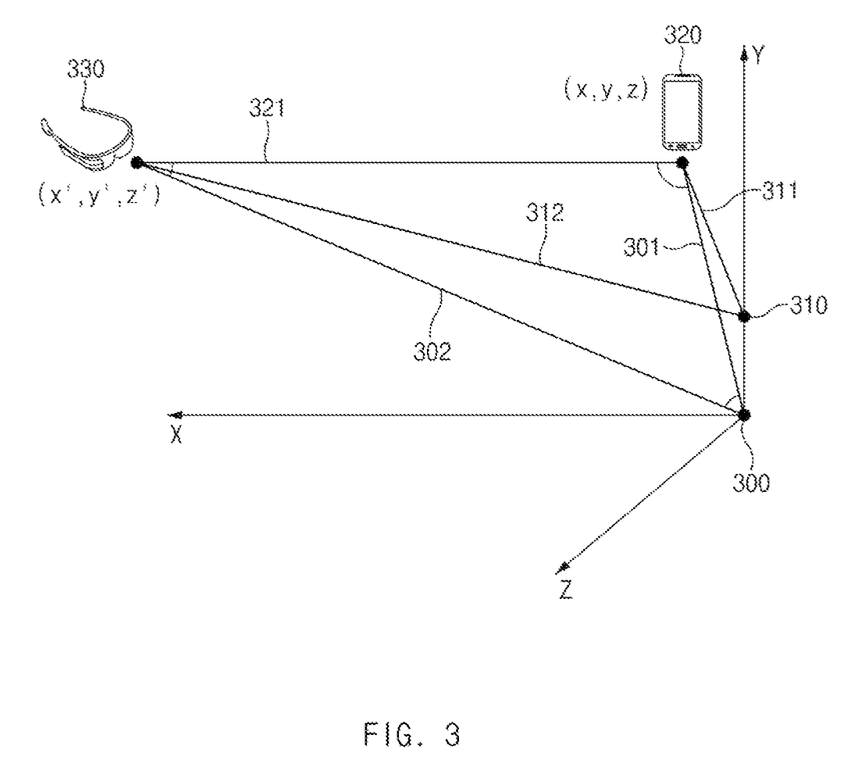
FIG. 3 is a view illustrating a process of estimating positions of a plurality of mobile devices within a vehicle.

FIG. 3 is a view illustrating a process of estimating positions of a plurality of mobile devices within a vehicle.

In FIG. 3, "300" denotes a position (0, 0, 0) of a first ultrasonic sensor, as a starting point on three-dimensional coordinate axes (xyz). The first ultrasonic sensor positioned at the starting point measures a distance 301 to a first mobile device 320 and measures a distance 302 to a second mobile device 330.

Also, "310" is a point spaced apart from the starting point 300 by a predetermined distance on the y axis, denoting a position (0, 1, 0) of a second ultrasonic sensor. The second ultrasonic sensor measures a distance 311 to the first mobile device 320 and measures a distance 312 to the second mobile device 330.

Also, the first mobile device 320 measures a distance 321 to the second mobile device 330. Here, the distance between the first mobile device 320 and the second mobile device 330 may be measured by a mobile device having an ultrasonic sensor.

On the basis of this, the position estimator 22 estimates the position of the first mobile device 320 and the position of the second mobile device 330.

Thereafter, the sensor searcher 23 searches for various sensors provided in the vehicle. That is, the sensor searcher 23 obtains information regarding various sensors provided in the vehicle from a vehicle network or electronic control units (ECU) of various driving assist systems. Here, the vehicle network includes a controller area network (CAN), a local interconnect network (LIN), FlexRay, and media oriented system transport (MOST).

Figure 4:
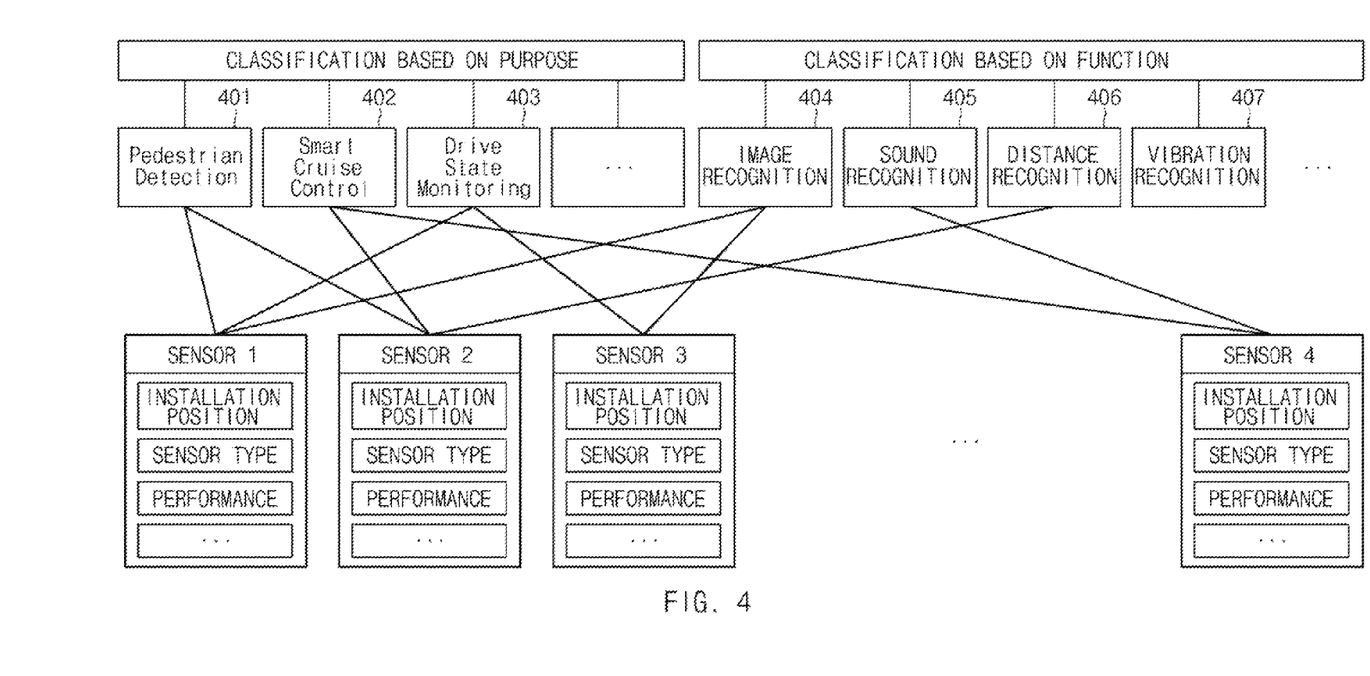
FIG. 4 is a view illustrating a result of classifying sensors of a vehicle according to purpose and function.

In particular, as illustrated in FIG. 4, the sensor searcher 23 classifies the searched sensors of the vehicle according to purposes and functions. That is, the sensor searcher 23 classifies the searched sensors of the vehicle into pedestrian detection 401, a smart cruise control (SCC) 402, driver state monitoring 403, and the like, according to purposes of the sensors, and classifies the searched sensors of the vehicle into image recognition 404, sound recognition 405, distance recognition 406, vibration recognition 407, and the like, according to functions.

For example, the sensor 1 is used for the pedestrian detection 401, the driver state monitoring 403, and the image recognition 404, the sensor 2 is used for the pedestrian detection 401, the SCC 402, and the distance recognition 406, the sensor 3 is used for the driver state monitoring 403 and the image recognition 404, and the sensor 4 is used for the SCC 402 and the sound recognition 405.

Figure 5:
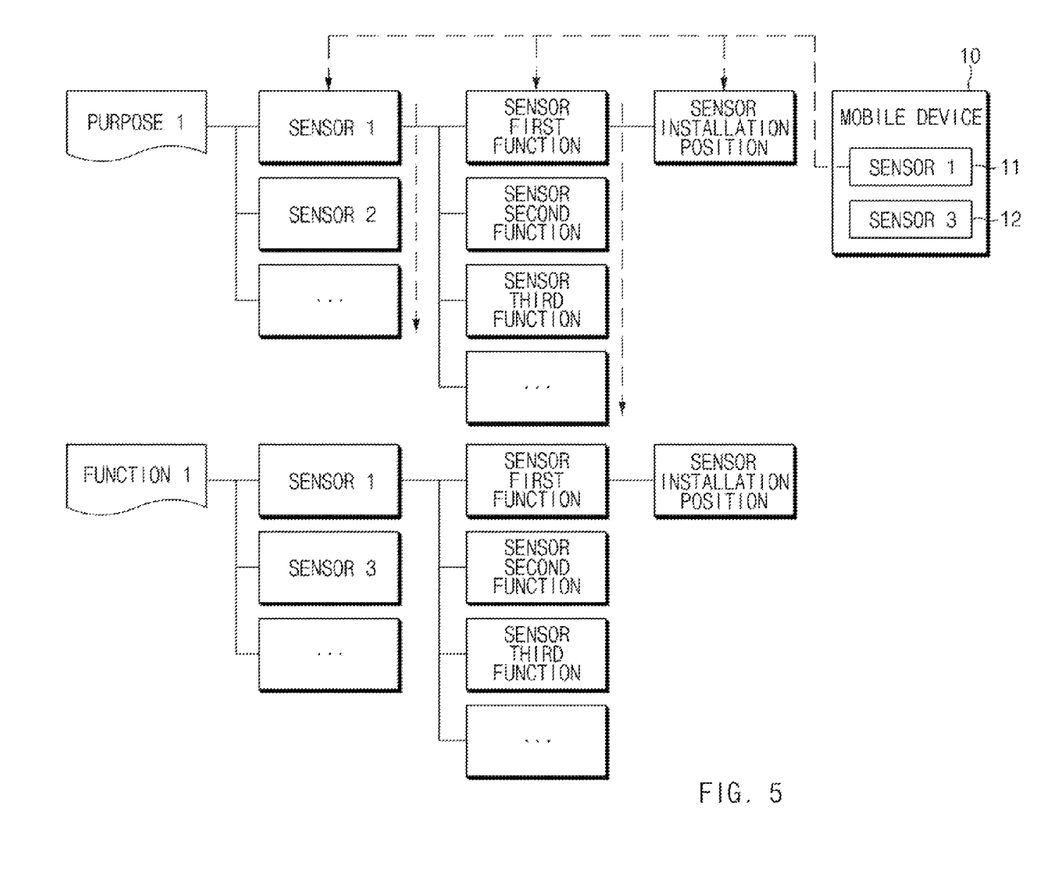
FIG. 5 is a view illustrating a result of matching sensors of a vehicle and sensors of a mobile device.

Thereafter, the sensor matcher 24 matches the sensors of the mobile device 10 and the sensors of the vehicle each other. That is, as illustrated in FIG. 5, the sensor matcher 24 matches the sensors of the vehicle and the sensors of the mobile device 10 in consideration of the types, functions, and positions of the sensors of the vehicle and the types, functions, and positions of the sensors of the mobile device 10.

Thereafter, the utilization information generator 25 constructs utilization information between the sensors of the mobile device 10 and the sensors of the vehicle on the basis of the result of matching from the sensor matcher 24.

That is, the utilization information generator 25 determines utilization by comparing the types, the functions, and the positions of the sensors of the mobile device 10 and the types, functions, and positions of the sensors of the vehicle matched to each other, and constructs utilization information between the sensors of the mobile device 10 and the sensors of the vehicle on the basis of the determined utilization.

The utilization information generator 25 gives scores corresponding to the types, functions, and positions of the sensors of the mobile device 10 with respect to the sensors of the vehicle. Here, when the scores given to the sensors of the mobile device 10 are "high", the utilization information generator 25 generates utilization information indicating that the sensors of the mobile device 10 may be used in place of the sensors of the vehicle. When the scores given to the sensors of the mobile device 10 are "medium", the utilization information generator 25 generates utilization information indicating that the sensors of the vehicle and the sensors of the mobile device 10 may be mixedly used together. When the scores given to the sensors of the mobile device 10 are "low", the utilization information generator 25 generates utilization information indicating that the sensors of the mobile device may be used instead when the sensors of the vehicle have an error.

Thereafter, the controller 26 may perform general controlling such that the components may function normally.

In particular, when the vehicle is started or when an ignition key is turned on, the controller 26 controls the sensor information collector 21 to collect sensor information.

Also, the controller 26 controls the position estimator 22 to estimate a position of the mobile device 10 within the vehicle.

Also, the controller 26 controls the sensor searcher 23 to search for various sensors provided in the vehicle.

Also, the controller 26 controls the sensor matcher 24 to match the sensors of the mobile device 10 and the sensors of the vehicle each other.

Also, the controller 26 stores utilization information generated by the utilization information generator 25 in the storage 27.

As a result, the controller 26 constructs the utilization information in the storage 27.

The controller 26 controls the components to track a movement of the mobile device 10 within the vehicle to periodically update utilization information. That is, the controller 26 controls the components to periodically generate utilization information.

In the present disclosure described above, the process of collecting sensor information from a single mobile device or a plurality of mobile devices has been described as an example. Hereinafter, in another exemplary embodiment, a process in which a plurality of mobile devices communicate with each other to select a representative mobile device and the selected representative mobile device performs the function of the mobile device 10 described above will be described.

The plurality of mobile devices positioned within a predetermined area periodically exchange performance information with each other. Here, the performance information includes whether the plurality of mobile devices are able to interwork with a vehicle, the number of retained sensors, CPU performance, whether the plurality of mobile devices are able to communicate with another mobile device, whether the plurality of mobile devices have a memory, and the like.

The plurality of mobile devices compare performance thereof with each other, and a mobile device having highest efficiency is selected as a representative mobile device.

For example, a mobile device having the largest number of sensors, among mobile devices which have a memory, are able to interwork with a vehicle, and are able to communicate with other mobile device, may be selected as a representative mobile device, or a mobile device having high CPU performance, among the mobile devices which have a memory, are able to interwork with a vehicle, and are able to communicate with other mobile device, may be selected as a representative mobile device. In general, a smartphone may be selected as a representative mobile device.

The selected representative mobile device may store sensor information received from other mobile devices, and when a sensor information request message is received from the utilization information constructing apparatus 20, the representative mobile device transmits the sensor information of other mobile devices, as well as sensor information of its own, to the utilization information constructing apparatus 20. Here, the pieces of sensor information are stored together with identification information of corresponding mobile devices in the memory.

Figure 6:
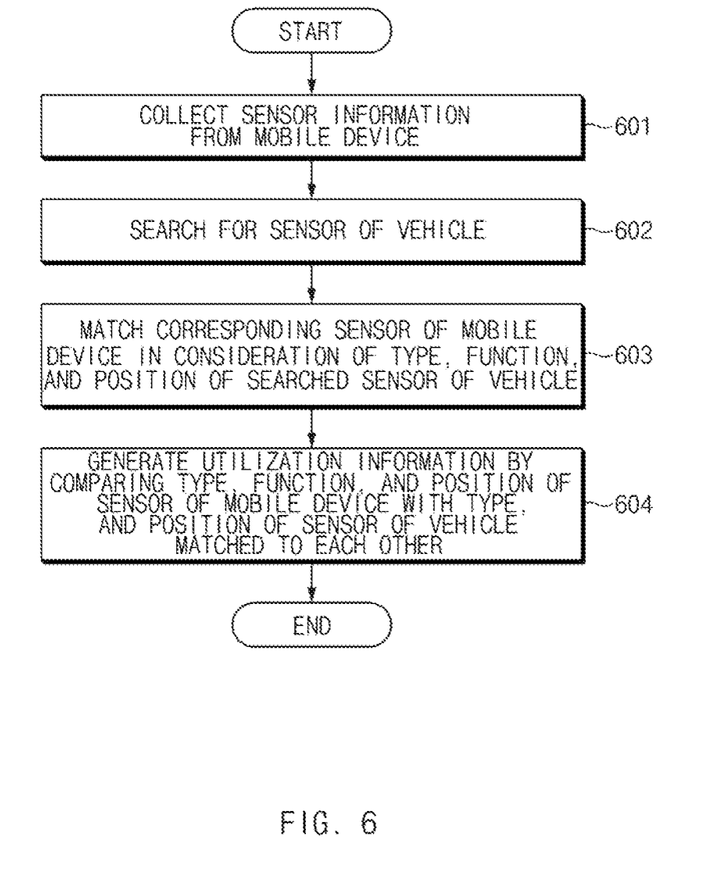
FIG. 6 is a flow chart illustrating a method for constructing utilization information of a sensor.

FIG. 6 is a flow chart illustrating a method for constructing utilization information of a sensor.

First, when a vehicle is started, the controller 26 activates the sensor information collector 21. Here, the controller 26 may also activate the sensor information collector 21 when an ignition key of the vehicle is turned on. Also, the controller 26 may activate the sensor information collector 21 when a door of the vehicle is unlocked or when a smart key system of the vehicle senses a smart key of a driver.

Next, the sensor information collector 21 collects sensor information from a mobile device in operation 601.

Thereafter, the sensor searcher 23 searches for sensors within the vehicle in operation 602.

Thereafter, the sensor matcher 24 matches corresponding sensors of the mobile device in consideration of types, functions, and positions of the searched sensors of the vehicle in operation 603.

Thereafter, the utilization information generator 25 generates utilization information by comparing the types, functions, and positions of the sensors of the mobile device and the types, functions, and positions of the sensors of the vehicle matched to each other in operation 604.

Through this process, various sensors installed in the mobile device held by an occupant of the vehicle may be utilized in the vehicle.

The method described above may also be created as a computer program, and codes and code segments configuring the program may be easily inferred by programmers in the art. In addition, the created program may be stored in a computer-readable recording medium (an information storage medium) and read and executed by a computer to implement the method of the present disclosure. The recording medium includes any type of recording medium that can be read by a computer.

As described above, in the exemplary form of the present disclosure, after information regarding various sensors installed in a mobile device of an occupant positioned within a vehicle are collected from the mobile device, the collected information is compared with characteristics of various sensors installed in the vehicle and analyzed to generate utilization information, whereby the various sensors of the mobile device may be utilized in the vehicle.

Also, in the exemplary form of the present disclosure, since various driving assist systems installed in the vehicle may use various sensors provided in the mobile device, performance of the driving assist systems may be enhanced.

In addition, in the exemplary form of the present disclosure, since various driving assist systems installed in the vehicle may use various sensors provided in the mobile device, cost for replacing a sensor of the driving assist system may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for constructing utilization information of a sensor, the apparatus comprising:
   a sensor information collector configured to collect sensor information from a mobile device;
   a sensor searcher configured to search for a sensor of a vehicle;
   a sensor matcher configured to match a corresponding sensor of the mobile device to the sensor of the vehicle searched by the sensor searcher in consideration of a type, function, and position of the sensor of the vehicle;
   a utilization information generator configured to compare a type, function, and position of the sensor of the mobile device and the type, function, and position of the sensor of the vehicle matched to each other by the sensor matcher to generate utilization information; and
   a controller configured to control the sensor information collector to collect the sensor information from the mobile device within the vehicle when the vehicle is started.

2. The apparatus according to claim 1, further comprising storage configured to store the utilization information generated by the utilization information generator.

3. The apparatus according to claim 1, further comprising a position estimator configured to estimate a position of the sensor of the mobile device within the vehicle.

4. The apparatus according to claim 3, wherein the position estimator has ultrasonic sensors present in different positions and is configured to measure distances to a plurality of mobile devices and to estimate positions of the plurality of mobile devices on the basis of the measured distances.

5. The apparatus according to claim 1, wherein the mobile device is a representative mobile device selected from among a plurality of mobile devices.

6. The apparatus according to claim 5, wherein the representative mobile device is a mobile device having a greatest number of sensors, among mobile devices which have a memory, are able to interwork with a vehicle, and are able to communicate with another mobile device.

7. The apparatus according to claim 5, wherein the representative mobile device is a mobile device having a highest CPU performance, among mobile devices which have a memory, are able to interwork with the vehicle, and are able to communicate with another mobile device.

8. A method of constructing utilization information of a sensor, the method comprising:
   activating, by a controller, a sensor information collector when a vehicle is started;
   collecting, by the sensor information collector, sensor information from a mobile device;
   searching, by a sensor searcher, for a sensor of the vehicle;
   matching, by a sensor matcher, a corresponding sensor of the mobile device to the searched sensor of the vehicle in consideration of a type, function, and position of the searched sensor of the vehicle; and
   comparing, by a utilization information generator, a type, function, and position of the sensor of the mobile device and the type, function, and position of the sensor of the vehicle matched to each other to generate utilization information.

9. The method according to claim 8, further comprising storing, by a storage, the generated utilization information.

10. The method according to claim 8, further comprising estimating, by a position estimator, a position of the sensor of the mobile device within the vehicle.

11. The method according to claim 10, wherein the estimating of the position includes:
    measuring distances to a plurality of mobile devices on the basis of ultrasonic sensors present in different positions; and
    estimating positions of the plurality of mobile devices on the basis of the measured distances.

12. The method according to claim 8, wherein the mobile device is a representative mobile device selected from among a plurality of mobile devices.

13. The method according to claim 12, wherein the representative mobile device is a mobile device having a greatest number of sensors, among mobile devices which have a memory, are able to interwork with the vehicle, and are able to communicate with another mobile device.

14. The method according to claim 12, wherein the representative mobile device is a mobile device having a highest CPU performance, among mobile devices which have a memory, are able to interwork with the vehicle, and are able to communicate with another mobile device.

\* \* \* \* \*